(12) United States Patent
Eckert et al.

(10) Patent No.: US 7,293,956 B2
(45) Date of Patent: Nov. 13, 2007

(54) ROLLED RING AIR BAFFLE FOR A GAS TURBINE ENGINE ROTATING CAVITY

(75) Inventors: Michael Charles Eckert, West Chester, OH (US); Kenneth Rees Bain, Loveland, OH (US)

(73) Assignee: General Electric Company, Schenectady, NY (US)

( * ) Notice: Subject to any disclaimer, the term of this patent is extended or adjusted under 35 U.S.C. 154(b) by 442 days.

(21) Appl. No.: 11/120,923

(22) Filed: May 3, 2005

(65) Prior Publication Data
US 2005/0191168 A1 Sep. 1, 2005

Related U.S. Application Data

(63) Continuation-in-part of application No. 10/654,672, filed on Sep. 4, 2003, now Pat. No. 7,008,181.

(51) Int. Cl.
*F03B 11/08* (2006.01)

(52) U.S. Cl. .................. 415/121.2; 415/169.1; 415/247 R; 29/DIG. 32

(58) Field of Classification Search ............... 415/115, 415/116, 9, 121.2, 169.1, 229; 29/DIG. 32
See application file for complete search history.

(56) References Cited

U.S. PATENT DOCUMENTS

| | | | |
|---|---|---|---|
| 4,141,705 A | 2/1979 | Campolong | |
| 4,361,213 A | 11/1982 | Landis, Jr. et al. | |
| 4,817,455 A * | 4/1989 | Buxe | 416/144 |
| 5,215,440 A | 6/1993 | Narayana et al. | |
| 5,498,273 A | 3/1996 | Mann | |
| 5,733,103 A | 3/1998 | Wallace et al. | |

* cited by examiner

*Primary Examiner*—Edward K. Look
*Assistant Examiner*—Dwayne J White
(74) *Attorney, Agent, or Firm*—William Scott Andes; Steven J. Rosen

(57) ABSTRACT

An annular air baffle for use in a cavity of an annular rotatable gas turbine engine component includes an annular split baffle ring having a plurality of circumferentially spaced apart and radially inwardly extending intermediate dams circumferentially disposed between first and second end dams. The intermediate dams and the first and second end dams extend radially inwardly from a continuous annular section. Voids are disposed between the intermediate dams and between the first and second end dams and adjacent ones of the intermediate dams. The voids are located radially inwardly of the continuous annular section and are formed by removing material from a split rolled ring rolled from barstock or a rod.

19 Claims, 5 Drawing Sheets

ROLLED RING AIR BAFFLE FOR A GAS TURBINE ENGINE ROTATING CAVITY

CROSS REFERENCE TO RELATED APPLICATIONS

This application is a Continuation-In-Part of commonly assigned U.S. patent application Ser. No. 10/654,672, filed Sep. 4, 2003, now U.S. Pat. No. 7,008,181, and incorporated herein by reference.

BACKGROUND OF THE INVENTION

1. Field of the Invention

The invention relates to aircraft gas turbine engine turbine cooling systems and, particularly, to rotating annular cavities that accumulate debris from such systems.

2. Description of Related Art

Gas turbine engines typically include a core engine having in serial, axial flow relationship, a high pressure compressor to compress the airflow entering the core engine, a combustor in which a mixture of fuel and the compressed air is burned to generate a hot gas flow. A high pressure turbine is rotated by the hot gas flow and drives the high pressure compressor through an interconnecting high pressure shaft. A low pressure turbine aft of the high pressure turbine drives a fan forward of the high pressure compressor by a low pressure shaft. Various cooling systems are used to duct relatively cool compressor air to the turbine for cooling purposes. The cooling air for turbine cooling contains a small amount of dust and debris which can accumulate in various annular cavities in the turbine as well as other rotating parts of the engine. As an example, cooling air may be flowed through holes in a shaft of a turbine disk and accumulate in an adjacent annular cavity in a hub of the disk. Such an arrangement may be found in a high pressure turbine of a General Electric CF6-80 series engine.

Such cavities are closed at an outer diameter and open at an inner diameter of the hub. Dust and debris can become entrapped and build up over time with continued operation of the engine. Since the rotor internal airflow usually has both axial and circumferential velocity relative to the rotor, such debris can circumferentially scrub the rotating part internal surfaces and, over time, cause damage to the parts.

It is highly desirable to have an article and apparatus that can prevent debris from circumferentially scrubbing internal surfaces of rotating part cavities that are closed at an outer diameter and open at an inner diameter of the parts and which, over time, can cause damage to the parts. It is also highly desirable to have such an article and apparatus that is inexpensive to manufacture and an inexpensive method of producing such an article and apparatus.

SUMMARY OF THE INVENTION

An annular air baffle for use in a cavity of an annular rotatable gas turbine engine component includes an annular split baffle ring having a plurality of circumferentially spaced apart and radially inwardly extending intermediate dams circumferentially disposed between first and second end dams. The intermediate dams and the first and second end dams extend radially inwardly from a continuous annular section. Voids separate and are disposed between the intermediate dams and between the first and second end dams and adjacent ones of the intermediate dams. The voids are located radially inwardly of the continuous annular section and are formed by removing material from a split rolled ring rolled from barstock or a rod.

In an exemplary embodiment of the baffle, the barstock or the rod is cylindrical with the voids having radially outer cylindrical surfaces along the continuous annular section. The intermediate dams include clockwise and counterclockwise facing surfaces at circumferential ends of the voids and the clockwise and counterclockwise facing surfaces are curved. The clockwise and counterclockwise facing surfaces are circular and include arcs of curvature. The arcs of curvature are defined by a radius of curvature and are substantially tangential to the outer cylindrical surfaces of the continuous annular section. The intermediate dams may include radially inner torroidal surfaces.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
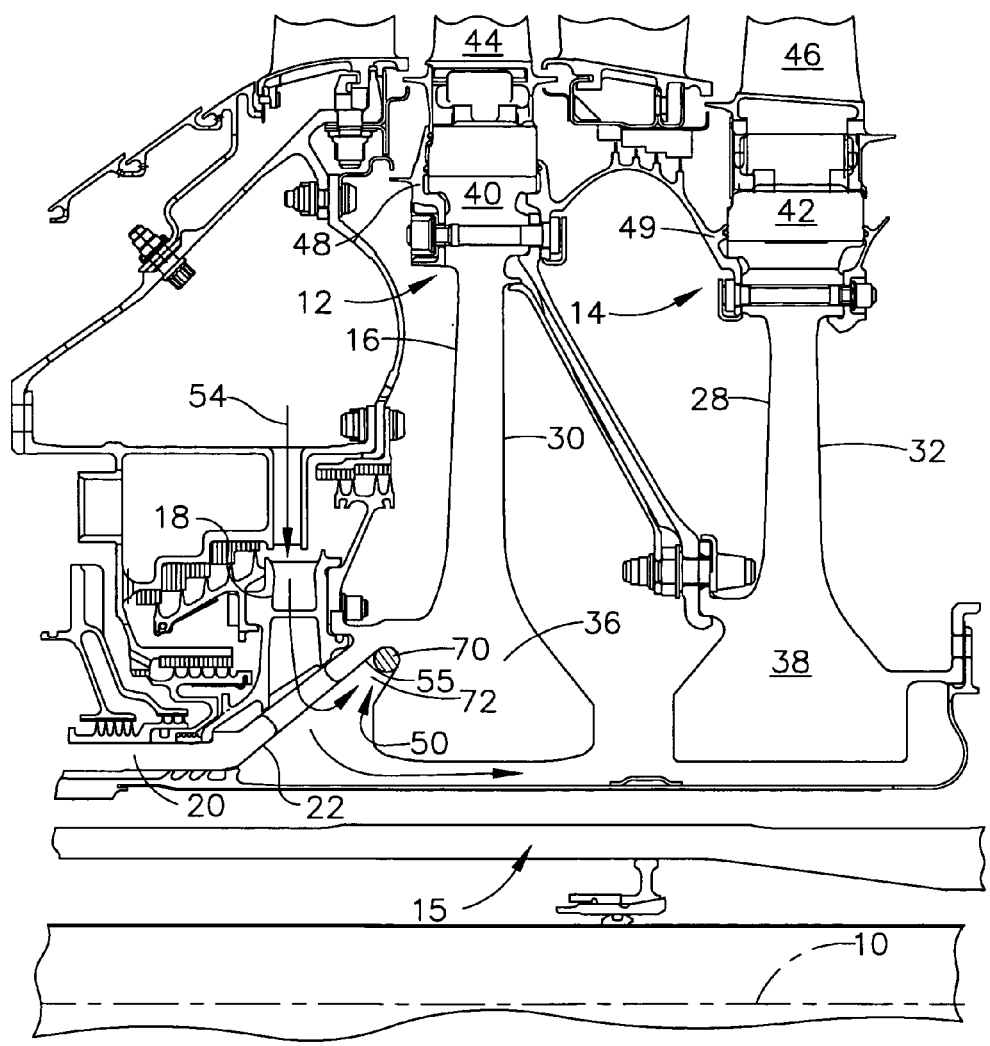
FIG. 1 is a longitudinal sectional view illustration of an exemplary rolled ring air baffle in a rotatable cavity of a hub of a turbine disk in a gas turbine engine.
Figure 2:
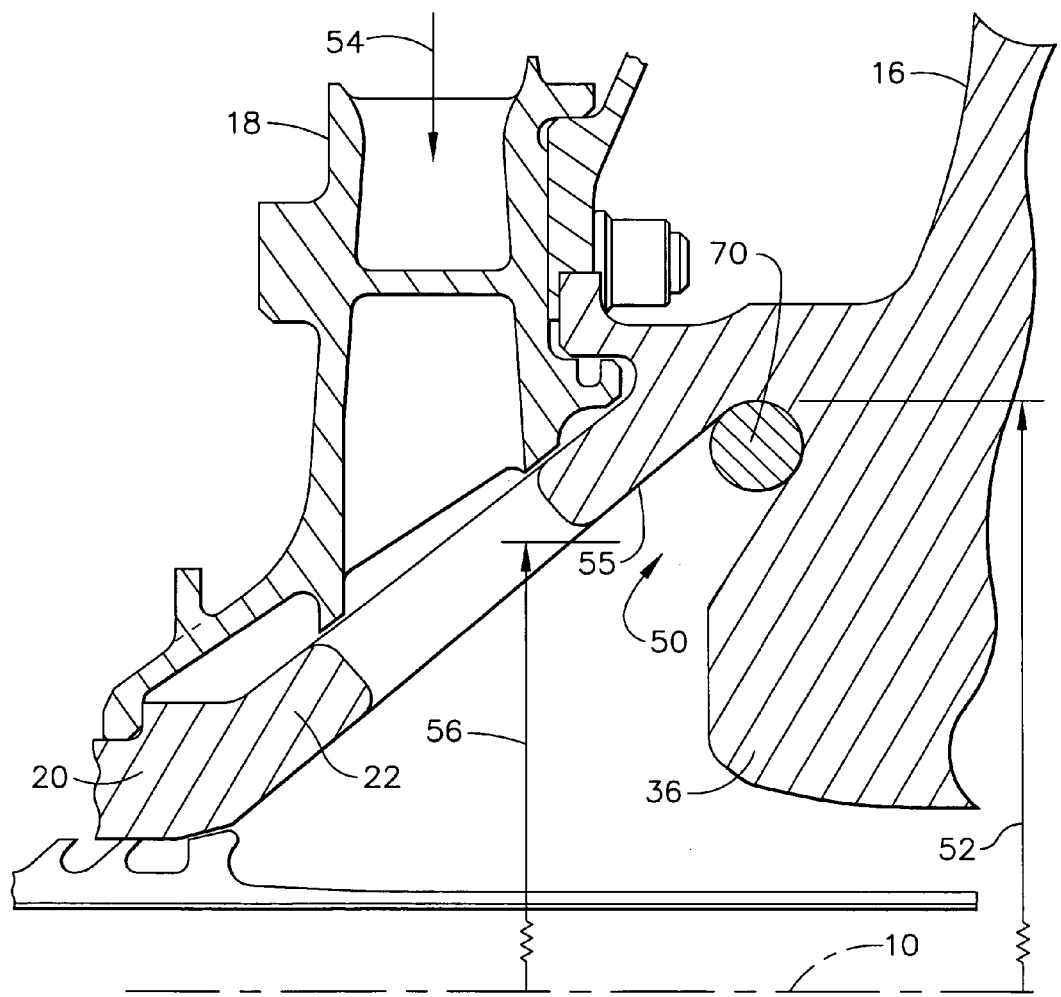
FIG. 2 is an enlarged sectional view illustration of the air baffle in the rotatable cavity illustrated in FIG. 1.

Illustrated in FIGS. 1 and 2 are high pressure turbine first and second stage disk assemblies 12 and 14 of a high pressure turbine assembly 15 circumscribed about an engine centerline 10 of a gas turbine engine such as a General Electric CF6-80 aircraft gas turbine engine. The first and second stage disk assemblies 12 and 14 include first and second disks 16 and 28 having slotted first and second rims 40 and 42 which receive first and second turbine blades 44 and 46, respectively, in a dovetail fit. First and second blades 44 and 46 are retained within their respective first and second rims 40 and 42 by first and second blade retainers 48 and 49, respectively. The first and second disks 16 and 28 include first and second webs 30 and 32 extending radially inwardly from the first and second rims 40 and 42 to first and second hubs 36 and 38, respectively. The first stage disk assembly 12 includes a cooling air deswirler 18 carried by a conical connection 22 to a cylindrical shaft 20 extending axially forwardly from the first hub 36 of the disk 16.

Referring to FIG. 2, an annular cavity 50 between the conical connection 22 to the cylindrical shaft 20 and the first hub 36 is closed at an outer diameter (OD) 52 of the first hub 36 and open and exposed to internal cooling airflow 54 passing through the cooling air deswirler 18 at an inner diameter (ID) 56 of the first hub 36. Dust and debris in the internal cooling airflow 54 can become entrapped and build up in the cavity 50 over time with continued operation of the engine. The internal cooling airflow 54 has both axial and circumferential velocities relative to the rotating first hub 36. Debris entrained in the internal cooling airflow 54 can circumferentially scrub rotating internal surfaces 55 of the rotating first hub 36 and, over time, cause damage to the first hub 36 and first disk 16.

The above exemplifies a general problem that may occur in a rotating or rotatable annular gas turbine engine component 58 having a cavity 50 closed at a radially outer diameter 52 and open and exposed to internal airflow at a radially inner diameter 56 of the part exemplified by the first hub 36. Centrifugal forces tend to extract dust and debris from the internal cooling airflow 54, trapping it in the radially inwardly facing cavity 50. Dust and debris then rotates in the cavity 50 relative to the rotating part causing a scrubbing action which then causes abrasive damage to the disk in a region including the cavity 50. This damage can be severe enough to cause the disk to be unserviceable at overhaul.

An annular ring air baffle 60 disposed in the annular cavity 50 is used to reduce or prevent this damage. The air baffle 60 reduces or eliminates the differential in circumferential velocity between the cooling flow and the rotating gas turbine engine component 58, thereby, preventing entrained debris from scrubbing the surface of the rotating part. The air baffle 60 also acts as a physical barrier that prevents entrained debris from scrubbing the surface of the rotating part.

Figure 3:
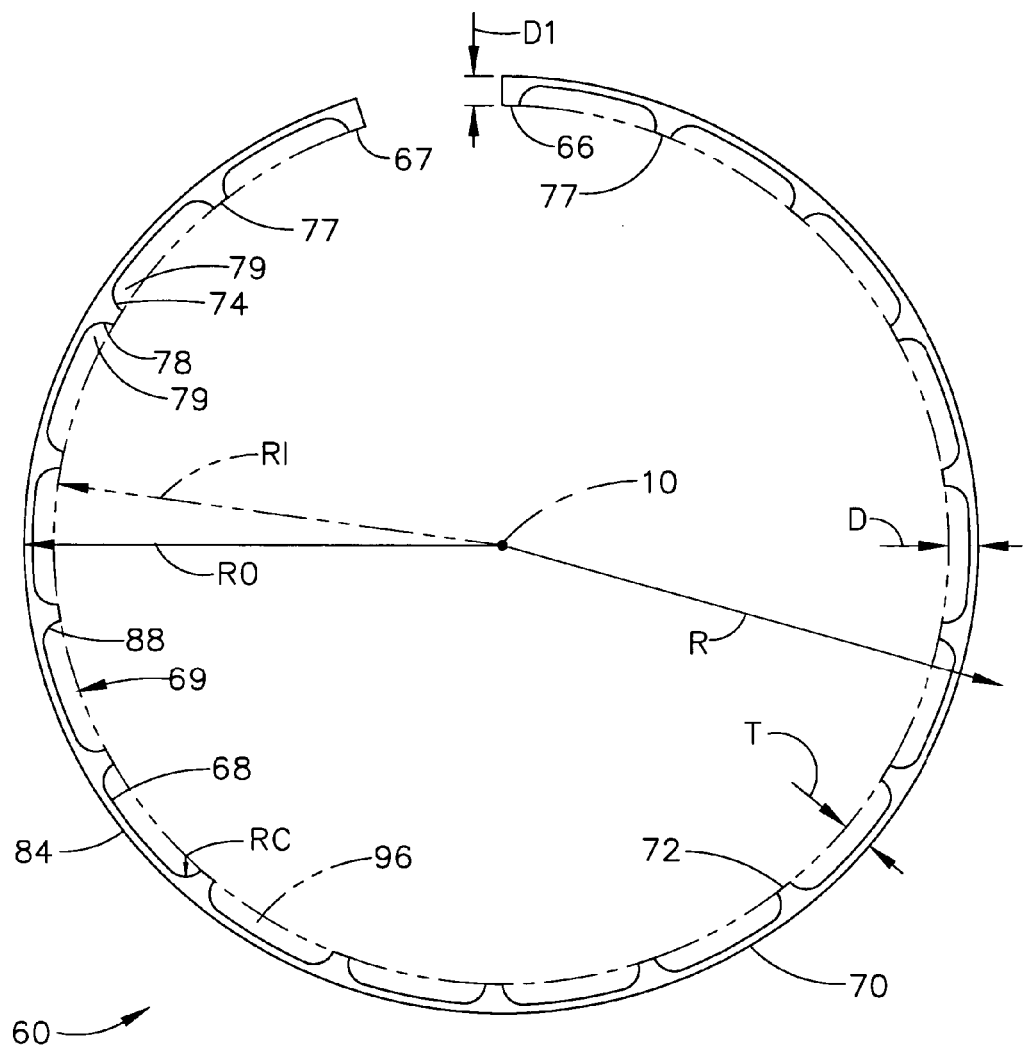
FIG. 3 is an axial sectional view illustration of the of the air baffle illustrated in FIG. 1.
Figure 4:
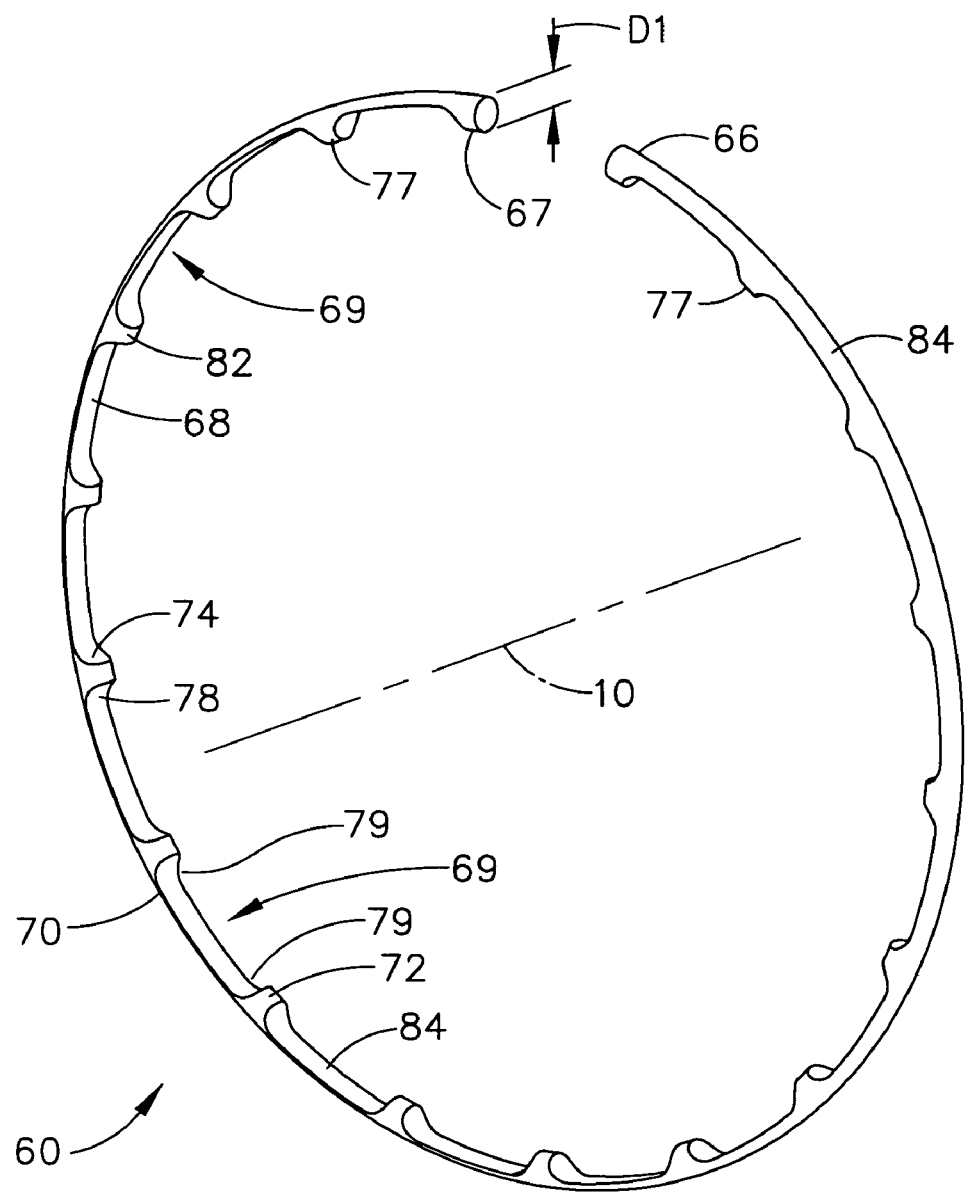
FIG. 4 is a perspective view illustration of the of the air baffle illustrated in FIG. 1.

Referring to FIGS. 3-4, the air baffle 60 includes an annular split baffle ring 70 having a plurality of circumferentially spaced apart and radially inwardly extending intermediate dams 72 circumferentially disposed between first and second end dams 66 and 67. The intermediate dams 72 and the first and second end dams 66 and 67 extend radially inwardly from a continuous annular section 84. Voids 69 separate and are disposed between the intermediate dams 72 and between the first and second end dams 66 and 67 and adjacent ones 77 of the intermediate dams 72.

Figure 5:
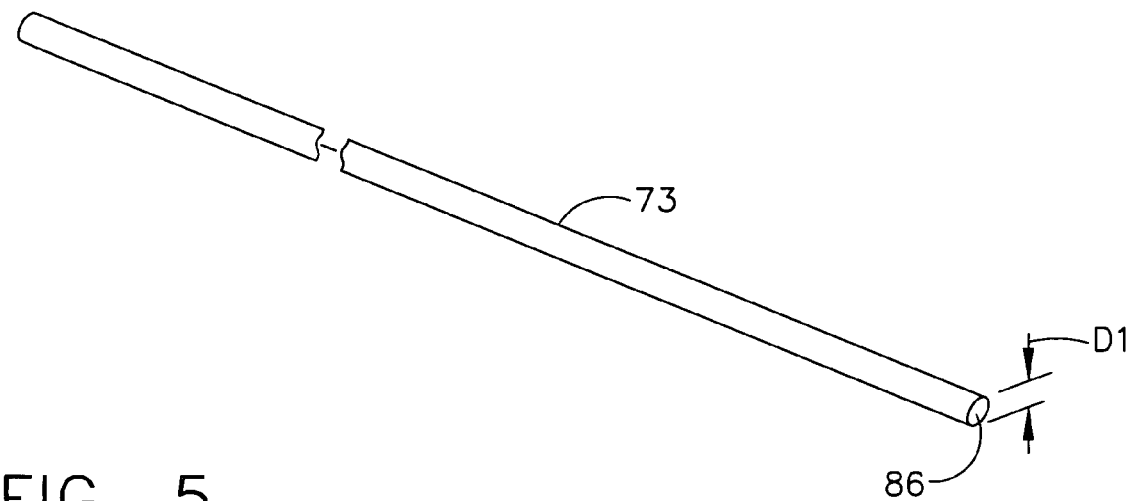
FIG. 5 is a perspective view illustration of a rod from which a ring for the air baffle illustrated in FIG. 3 is rolled.
Figure 6:
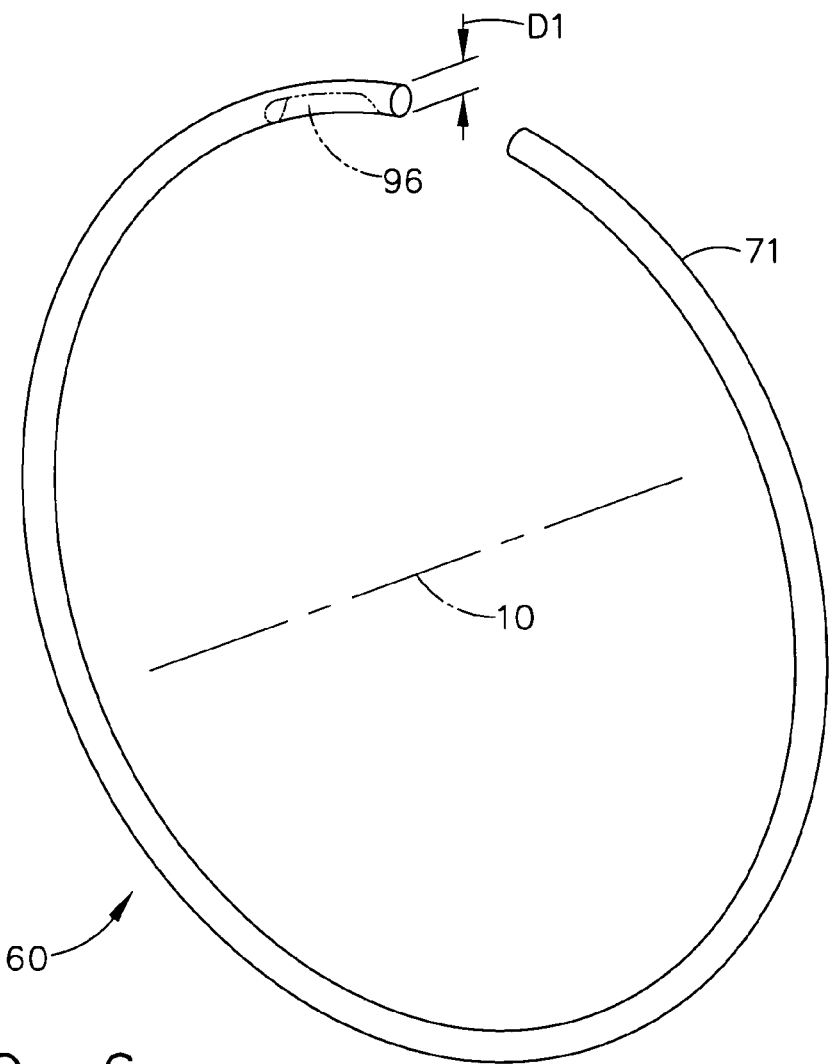
FIG. 6 is a perspective view illustration of the ring rom which the air baffle illustrated in FIG. 3 is formed.

The voids 69 are located radially inwardly of the continuous annular section 84 and are formed by removing material 96, such as by machining, from a split rolled ring 71 rolled from barstock or a rod 73 illustrated in FIGS. 5 and 6. The material 96 is removed from portions of the rolled ring 71 radially between the continuous annular section 84 and an inner radius RI of the baffle ring 70 or of the rolled ring 71. The continuous annular section 84 lies radially between an outer radius RO of the baffle ring 70 or of the rolled ring 71. A cast or otherwise formed ring may used instead of the rolled ring 71 rolled from barstock or a rod 73 and the voids 69, at least in rough, may also be cast in or otherwise formed. The barstock or a rod 73 illustrated herein is cylindrical having a constant circular cross-section 86 but barstock or rods 73 having another cross-section may be used.

In an exemplary embodiment of the baffle 60 illustrated herein, the barstock or the rod 73 is cylindrical. Thus, the voids 69 illustrated in FIGS. 3-4 have radially outer cylindrical surfaces 68 along the continuous annular section 84 and circumscribed about the engine centerline 10. The intermediate dams 72 include clockwise and counterclockwise facing surfaces 74 and 78 at circumferential ends 79 of the voids 69 and the clockwise and counterclockwise facing surfaces 74 and 78 are curved. The clockwise and counterclockwise facing surfaces 74 and 78 are circular and include arcs of curvature 88. The arcs of curvature 88 are defined by a radius of curvature RC and are substantially tangential to the outer cylindrical surfaces 68 of the continuous annular section 84. The intermediate dams 72 include radially inner torroidal surfaces 82.

One exemplary baffle 60 is made from cylindrical barstock or rod 73 having a diameter D1 of 0.35 inches. The baffle ring 70 or the rolled ring 71 has an inner radius RI of 5.241 inches and an outer radius RO of 5.416 inches. A radial depth D of the voids 69 is 0.25 inches and a radial thickness T of the continuous annular section 84 between the outer cylindrical surfaces 68 and the outer radius RO is 0.1 inches. The intermediate dams 72 are symmetrical about a bisecting radius R normal to the engine centerline 10 which is also the axis of rotation of the baffle ring 70 and bisects intermediate dams 72. This allows the annular air baffle 60 to be inserted into the cavity 50 backwards or forwards. This is often referred to as Murphy Proofing to avoid the air baffle 60 being inserted in a position that doesn't reduce or prevent entrained debris from scrubbing the surface of the rotating part. The intermediate dams 72 have circular cross-sectional shapes.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Accordingly, what is desired to be secured by Letters Patent of the United States is the invention as defined and differentiated in the following claims.

What is claimed is:

1. An annular air baffle comprising:
    an annular split baffle ring,
    the split baffle ring having a plurality of circumferentially spaced apart and radially inwardly extending intermediate dams circumferentially disposed between first and second end dams,
    the intermediate dams and the first and second end dams extending radially inwardly from a continuous annular section,
    voids disposed between the intermediate dams and between the first and second end dams and adjacent ones of the intermediate dams,
    the voids being located radially inwardly of the continuous annular section, and
    the voids having been formed by removing material from a split rolled ring rolled from barstock or a rod.

2. An annular air baffle as claimed in claim 1 further comprising the barstock or rod being cylindrical and the voids having radially outer cylindrical surfaces along the continuous annular section.

3. An annular air baffle as claimed in claim 2 further comprising the intermediate dams having clockwise and counterclockwise facing surfaces at circumferential ends of the voids.

4. An annular air baffle as claimed in claim 3 further comprising the clockwise and counterclockwise facing surfaces being curved.

5. An annular air baffle as claimed in claim 3 further comprising:
    the clockwise and counterclockwise facing surfaces being circular,
    arcs of curvature of the clockwise and counterclockwise facing surfaces, and
    the arcs of curvature being defined by a radius of curvature and being substantially tangential to the outer cylindrical surfaces of continuous annular section.

6. An annular air baffle as claimed in claim 5 further comprising the intermediate dams having radially inner torroidal surfaces.

7. A rotatable annular gas turbine engine component comprising:
   a cavity closed at a radially outer diameter and open at a radially inner diameter of the first hub,
   an annular air baffle disposed within the cavity,
   the air baffle including an annular split baffle ring,
   the split baffle ring having a plurality of circumferentially spaced apart and radially inwardly extending intermediate dams circumferentially disposed between first and second end dams,
   the intermediate dams and the first and second end dams extending radially inwardly from a continuous annular section,
   voids disposed between the intermediate dams and between the first and second end dams and adjacent ones of the intermediate dams,
   the voids being located radially inwardly of the continuous annular section, and
   the voids having been formed by removing material from a split rolled ring rolled from barstock or a rod.

8. A component as claimed in claim 7 further comprising the barstock or the rod being cylindrical and the voids having radially outer cylindrical surfaces along the continuous annular section.

9. A component as claimed in claim 8 further comprising the intermediate dams having clockwise and counterclockwise facing surfaces at circumferential ends of the voids.

10. A component as claimed in claim 9 further comprising the clockwise and counterclockwise facing surfaces being curved.

11. A component as claimed in claim 9 further comprising:
   the clockwise and counterclockwise facing surfaces being circular,
   arcs of curvature of the clockwise and counterclockwise facing surfaces, and
   the arcs of curvature being defined by a radius of curvature and being substantially tangential to the outer cylindrical surfaces of continuous annular section.

12. A component as claimed in claim 11 further comprising the intermediate dams having radially inner torroidal surfaces.

13. A high pressure turbine assembly comprising:
   high pressure turbine first and second stage disk assemblies circumscribed about a centerline,
   the first and second stage disk assemblies including first and second disks having first and second rims supporting first and second turbine blades, respectively,
   first and second webs extending radially inwardly from the first and second rims, to first and second hubs, respectively,
   a conical connection to a cylindrical shaft extending axially forwardly from the first hub of the disk,
   an annular cavity between the conical connection to the cylindrical shaft and the first hub,
   the cavity closed at a radially outer diameter and open at a radially inner diameter of the first hub,
   an annular air baffle disposed within the cavity,
   the air baffle including an annular split baffle ring having a plurality of circumferentially spaced apart and radially inwardly extending intermediate dams circumferentially disposed between first and second end dams,
   the intermediate dams and the first and second end dams extending radially inwardly from a continuous annular section,
   voids disposed between the intermediate dams and between the first and second end dams and adjacent ones of the intermediate dams,
   the voids being located radially inwardly of the continuous annular section, and
   the voids having been formed by removing material from a split rolled ring rolled from barstock or a rod.

14. An assembly as claimed in claim 13 further comprising the barstock or the rod being cylindrical and the voids having radially outer cylindrical surfaces along the continuous annular section.

15. An assembly as claimed in claim 14 further comprising the intermediate dams having clockwise and counterclockwise facing surfaces at circumferential ends of the voids.

16. An assembly as claimed in claim 15 further comprising the clockwise and counterclockwise facing surfaces being curved.

17. An assembly as claimed in claim 15 further comprising:
   the clockwise and counterclockwise facing surfaces being circular,
   arcs of curvature of the clockwise and counterclockwise facing surfaces, and
   the arcs of curvature being defined by a radius of curvature and being substantially tangential to the outer cylindrical surfaces of continuous annular section.

18. An assembly as claimed in claim 17 further comprising the intermediate dams having radially inner torroidal surfaces.

19. A method to make an annular air baffle comprising:
   barstock or a rod is rolled to form a split rolled ring,
   material is removed from the rolled ring to form a split baffle ring having a plurality of circumferentially spaced apart and radially inwardly extending intermediate dams circumferentially disposed between first and second end dams and extending radially inwardly from a continuous annular section of the split baffle ring, and
   the material is removed from the rolled ring to further form voids disposed between the intermediate dams and between the first and second end dams and adjacent ones of the intermediate dams, the voids being located radially inwardly of the continuous annular section.

* * * * *